Nov. 28, 1967   G. DE COYE DE CASTELET   3,354,745
TRANSMISSION GEAR-BOXES OF VEHICLES FOR TRANSMISSION ON ONE
OR MORE AXLES, WITH SPECIAL REDUCTION
FOR RUNNING ON VARIED GROUND
Filed June 4, 1965   4 Sheets-Sheet 2

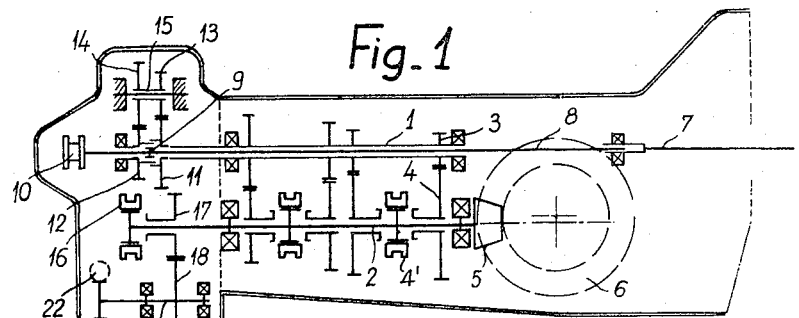
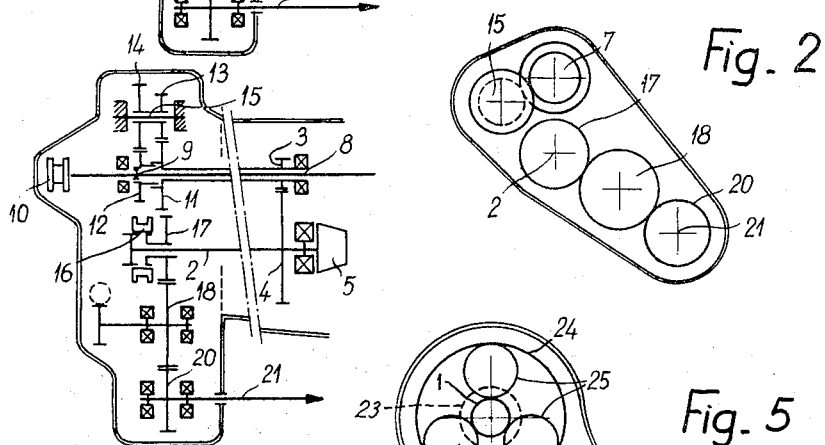
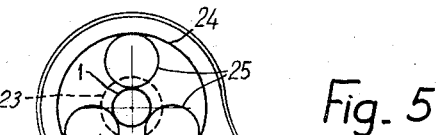
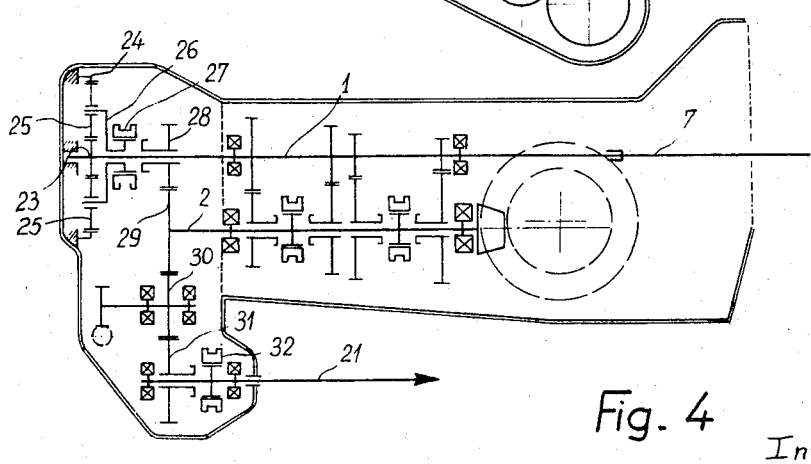

Inventor
Gaetan DeCoye De Castelet
Stevens, Davis, Miller & Mosher
Attorneys

Inventor
Gaetan De Coye De Castelet
Stevens, Davis, Miller & Mosher
Attorneys

Nov. 28, 1967 G. DE COYE DE CASTELET 3,354,745
TRANSMISSION GEAR-BOXES OF VEHICLES FOR TRANSMISSION ON ONE
OR MORE AXLES, WITH SPECIAL REDUCTION
FOR RUNNING ON VARIED GROUND
Filed June 4, 1965 4 Sheets-Sheet 4

Inventor
Gaetan De Coye De Castelet

Attorneys

United States Patent Office 3,354,745
Patented Nov. 28, 1967

3,354,745
TRANSMISSION GEAR-BOXES OF VEHICLES FOR TRANSMISSION ON ONE OR MORE AXLES, WITH SPECIAL REDUCTION FOR RUNNING ON VARIED GROUND
Gaetan de Coye de Castelet, Billancourt, France, assignor to Regie Nationale des Usines Renault, Billancourt, France, a French work
Filed June 4, 1965, Ser. No. 461,337
Claims priority, application France, June 11, 1964, 977,938, Patent 1,407,696; Jan. 5, 1965, 850, Patent 87,137
9 Claims. (Cl. 74—665)

ABSTRACT OF THE DISCLOSURE

In a change-speed gear transmission for motor vehicles, an additional speed reduction gearing selectively actuatable to reduce the speed of an output shaft by either acting directly back through the primary shaft and the conventional gearing through reduction gearing between the primary shaft and the drive shaft or driving the secondary shaft directly from the reduction gearing which is driven by the drive shaft.

The invention relates to systems of transmission for automobile vehicles by transmission gear-boxes and concerns the addition to these conventional axle casings, of a special speed-reduction system for running on varied ground.

The invention has for its object to obtain, at the lowest possible cost, a mixed vehicle giving the pleasure of comfort and speed on hard-surfaced roads together with the possibilities of traveling and working on all kinds of ground, and to utilize for this result a transmission mechanism derived as closely as possible from an assembly already built by mass-production methods, not requiring any important modifications of structure, even of a conventional vehicle.

Whereas in the majority of vehicles for all kinds of ground, the transfer to the axles is effected by a separate mechanism and the reduction gear thereby affects all the ratios of the gear-box, in the preferred construction forming the object of the invention, the reduction gear and the transfer are grouped together in a cover of the gear-box.

In a first form of embodiment, there is provided a means for gearing down of the engine torque in two phases, the first obtained by a set of pinions in a special casing at the end of the shaft passing through the primary shaft of the conventional gear-box, the second by utilizing the pinions of the first gear (or reverse gear) of this gear-box itself, these pinions being suitably reinforced for that purpose. This use of additional step-down gearing is applied only to the first gear (or reverse gear).

According to another form of embodiment, the increased torque also passes through the train of the second gear of the conventional gear-box, so as to obtain a second slow gear with a high step-down ratio, and when so required, through the other ratios of this gear-box, which makes it possible to obtain a continuous succession of step-down ratios, resulting in an improvement in performance.

A further characteristic feature resides in the operation by a sliding gear (synchronizer or not), known per se, of the additional step-down gearing, which avoids the complication of engagement by sliding of the shaft passing through the hollow primary shaft.

Another characteristic feature consists of the addition of a brake (known in itself) on an extension of the intermediate shaft between the output shaft of the box and the transfer shaft to the additional axle or axles, so as to serve as an auxiliary brake under a single control, common to this brake and to the conventional parking brake, in order to ensure the immobilization of the vehicle on the steepest slopes which are accessible to it.

In the accompanying drawings:

FIGS. 1 and 2 show in diagrammatic manner respectively in side view and in partial section taken along a plane perpendicular to the shafts of the gear-box, an embodiment with a reduction system passing through the first gear of the gear-box;

FIG. 3 shows the previous embodiment in which there is seen, by the selected determination of the engagement of the dogs, the movement transmitted to the axles, the special reduction system being engaged;

FIGS. 4 and 5 show a form of construction with a special reduction gear system, in juxtaposition to the gear-box but separate from the latter, and comprising an epicycloidal train;

Figure 7:
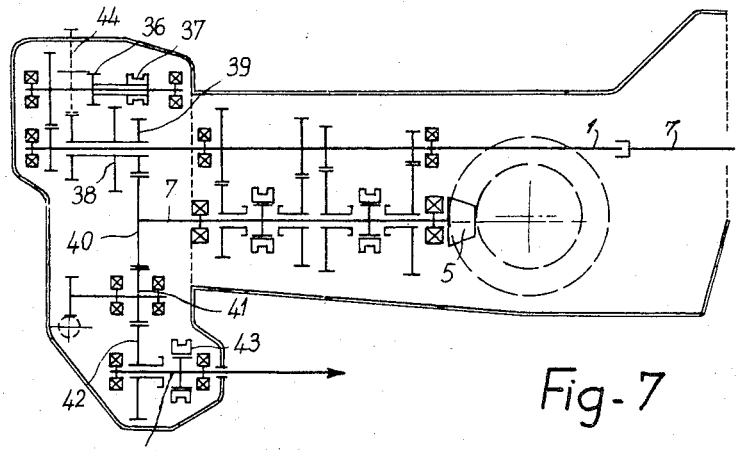
FIGS. 7 and 8 show the addition to the arrangement of FIG. 6 of a direction-reversing device.

Referring to the drawings, and more particularly to FIGS. 1 and 2, it is seen that the conventional gear-box, in its essential parts, comprises the hollow primary shaft 1 and the secondary shaft 2 carrying the usual pinions of the various gears, and in particular the pinions 3 and 4 of the first gear, this latter pinion being rigidly fixed to the shaft 2 by dogs 4' and controlling the bevel gears 5 and 6 which operate one of the axles.

The driving shaft 7 is coupled to the shaft 8 by a sliding system, and passes inside the hollow primary shaft 1. The shaft 8 carries at its extremity a male dog clutch 9 actuated axially by the shifting means 10, and this male dog 9 can be put into engagement either with a pinion 11 carried by the extremity of the primary shaft 1 or with a pinion 12 mounted freely on its supporting shaft. The pinions 11 and 12 engage respectively on the double pinion 13, 14, mounted freely on the shaft 15.

The extremity of the shaft 2 carries a dog 16 which can be engaged with a pinion 17 freely mounted on the shaft 2 and engaging with an intermediate pinion 18 mounted on the shaft 19 and itself in engagement with a pinion 20 mounted on the shaft 21 driving the other axle or axles of the vehicle.

The driving shaft 7 transmits its movement through the intermediary of the sliding shaft 8, through the primary shaft 1 to the male dog 9 which, actuated axially by the shifting means 10, can be engaged in an internal spline carried by the pinion 11 for the normal operation without additional reduction gears, the movement being transmitted from the shaft 8 to the primary shaft 1 and from thence through the usual pinions of the gear-box to the bevel gears.

In high reduction gear, the dog 9 is engaged with the pinion 12 and the movement thus passes through the pinion 12, the double pinion 14, 13, then the pinion 11 the primary shaft 1, the pinions 3, 4 of the first gear and the bevel gears 5 and 6, the first gear being then engaged The bevel pinion 5 transmits its movement, through the extremity of the shaft 2 and the dog 16 which fixes the pinion 17 with respect to shaft 2, to the shaft 21, toward: the wheels of the other axle, passing through the reversing pinions 17, 18 and 20.

A known interlock or prohibition device (not shown)

prevents the engagement of the high reduction gear and therefore the dog engagement of the pinion 12 when the dog 16 is not engaged with the dog carried by the pinion 17; this prevents overloading of the bevel gears 5 and 6 which would be subjected alone to the high torque of the high reduction gear.

In FIG. 3 is shown the position of the sliding dogs 9 and 12 engaged so as to obtain the most geared-down speed of the two shafts 2 and 21, the dog 16 being engaged on the pinion 17.

By engaging only the pinion 12, the sliding dog 9 drives in rotation the pinion 11 and therefore the primary shaft 1. The movement is transmitted to the shafts 2 and 21 in the normal step-down gear ratios given by the gear-box. The vehicle can therefore take advantage in this case, on the road over all types of ground, of all its driving axles.

The tachometer drive is shown at 22.

In the simplified arrangement of the gear-box shown in FIGS. 4 and 5, use is no longer made of the step-down ratio of the first gear inside the box; the high step-down ratio permitting more particularly the negotiation of steep slopes is obtained by an epicycloidal train followed by a simple reversing gear.

The driving shaft 7 drives the primary shaft 1 of the box which, extended, carries the central pinion 23 of a single epicycloidal train with a fixed crown-wheel 24. The satellites 25 are carried by a member 26 which comprises a spline on which slides a sliding gear 27. The satellite-carrier 26 rotates freely on the shaft 1, but the sliding gear 27 comprises a dog which can be engaged with the dog of pinion 28 mounted freely on the primary shaft.

The pinion 28 directly drives the pinion 29, keyed on the shaft 2, and transmits its movement to the pinions 30 and 31 so as to terminate at the transmission shaft 21 leading towards the other axles. A sliding gear 32 can be engaged with the dog of the freely-mounted pinion 31.

This, when the sliding gear 27 is engaged on the dog of the pinion 28, the shaft 2 is given the maximum reduction through the epicycloidal train and the reversing gear 28, 29. As in the preceding type, the dog 27 cannot be engaged unless the dog 32 is also engaged.

Finally, the engagement of the dog 32 on the pinion 31, mounted freely on the shaft 21, permits the vehicle to take advantage of all the ratios of the gear-box on all the axles of the vehicle; the sliding gear 27 is then disengaged from the pinion 28.

Figure 6:
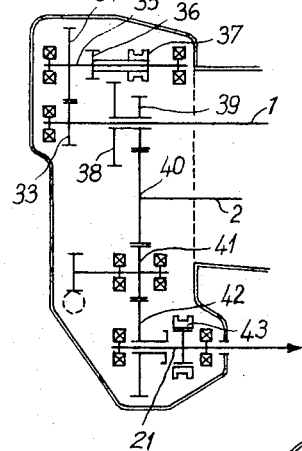
FIG. 6 shows an alternative form of the previous embodiment with a special reduction gear system external to the gear-box.

The foregoing mechanism of FIGS. 4 and 5 can be obtained without an epicycloidal train; it then has the arrangement shown in FIG. 6.

The primary shaft 1 drives the pinion 33 which is keyed on it. The pinion 33 engages with a pinion 34 carried by the shaft 35, while a pinion 36 fixed for rotation with the shaft 35 but being able to slide on it by action on the sliding gear 37, can be brought into engagement with the pinion 38 of the double pinion 38–39, mounted freely on the shaft 1. The pinion 39 engages with the pinion 40 carried by the shaft 2 driving the axle, and the pinion 40 engages with the pinion 41 which itself is engaged with the pinion 42. A sliding gear 43, fixed for rotation with the shaft 21 and driving the other axle or axles, can be engaged with the free pinion 42.

Figure 8:
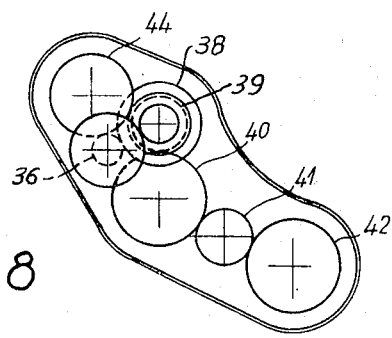

A known reversing device has been added to the version of FIG. 6 and is shown in FIGS. 7 and 8; the sliding gear 37 can then, depending on its axial position, permit the pinion 36 to engage either with the pinion 38, which corresponds to FIG. 6 or to be in neutral, or to engage the pinion 36 with the pinion 44 in order to obtain reverse running.

By construction, this reversing device, which is simple, results in a slightly lower step-down gear in reverse running than for forward running, which does not constitute an obstacle but has the advantage of facilitating extraction of the vehicle when it may be bogged-down.

The same safety devices are employed on very high reduction gears, the driving axles being preferably at this moment under power.

The shifting into neutral of the sliding gear 37 permits the movement of the vehicle with all its wheels driven, by utilizing all the ratios of the gear-box, the sliding gear 43 being then engaged on the pinion 42.

There has been shown in FIGS. 9, 10 and 11 an alternative form of construction, with the essential differences, from the preceding arrangement described with reference to FIGS. 6, 7 and 8.

There is a similarity as regards the reversal of movement, to the version described in FIGS. 6, 7 and 8, with this difference:

(1) The reduction gear terminates at the central pinion of the transfer countershaft instead of the driving pinion constituting the secondary shaft of the box.

(2) The interruption of the movement is effected:

(a) For the reduction gear by the two sliding gears 37 and 48 operated together, in order to isolate the step-down gear-train, not only from the transfer countershaft but also from the primary shaft;

(b) For the transfer, by the dog 52.

Of course, the condition of not being able to engage the sliding gears 37 and 48 if the dog 52 is not engaged, is maintained, with the object of preventing overload on the bevel gears of the gear-box which would be subjected alone to the high step-down ratio reserved for exceptional use.

Figure 9:
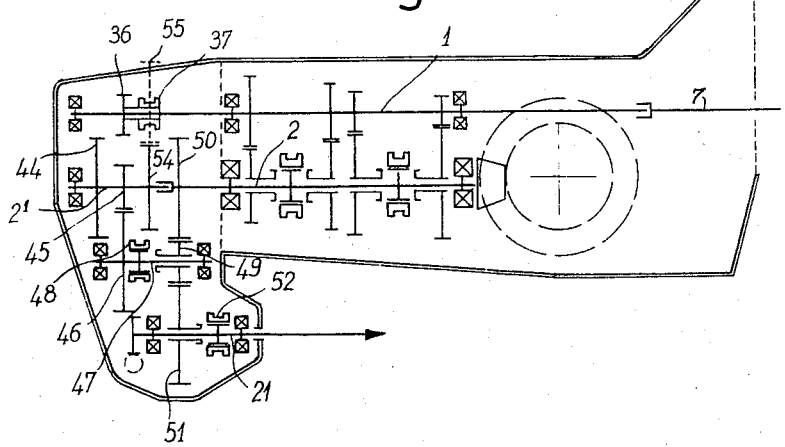
FIGS. 9, 10 and 11 show an embodiment associated with FIGS. 6, 7 and 8, in which the reduction gear is introduced not on the secondary shaft of the gear-box, but on the shaft which carries the intermediate pinion of the transfer countershaft.
Figure 11:
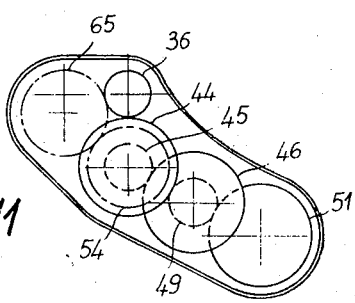

The arrangement of FIGS. 9 and 11 relates to a reduction gear with forward and reverse running. In FIG. 9, on the extension of the primary shaft 1 is mounted the pinion 36 fast for rotation with this shaft and able to slide on the latter by acting on the sliding gear 37. A shaft 2' mounted as an extension of the shaft 2, but independently of this latter, carries the two pinions 44 and 45, the pinion 45 engaging with the pinion 46 carried by the intermediate shaft 47, while a sliding gear 48 with dog mounted on this shaft enables this shaft to be made fast with the pinion 49 engaging on the one hand with the pinion 50 of the secondary shaft 2 and on the other hand with the pinion 51 mounted freely on the driving shaft 21 of the axles other than that driven by the bevel gears of the box.

A sliding gear with dog 52 enables the pinion 51 to be fixed on the shaft 21. In this FIG. 9, the pinions 54 of the shaft 2', and 55 are the reversing gear pinions arranged in known manner.

If the sliding gears 37 and 48 are operated so as to bring them into engagement respectively with the pinions 44 and 49, the movement is transmitted, geared down, to the shaft 2 of the bevel gears by the pinions 36, 44, 45, 46, 49 and 50 and at the same time to the shaft 21 if, by the sliding gear 52, the pinion 51 is put into engagement with this shaft 21. For transmission without special step-down gearing, all the axles being driven, the sliding gears 37 and 48 are disengaged from the pinions 44 and 49, while the sliding gear 52 is engaged with the pinion 51 which directly drives the shaft 21.

Figure 10:
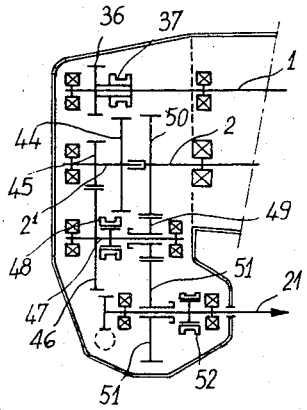

FIG. 10 relates to an arrangement very similar to that preceding for the reduction gear on forward running only, and comprises the same step-down gearing arranged in a different manner as regards particularly the pinions 44 and 45.

The arrangement of the embodiment of FIGS. 9, 10 and 11 has the particular feature of introducing the speed reduction, not on the secondary shaft of the box (driving pinion) but on the shaft which carries the intermediate pinion of the transfer countershaft.

This arrangement divides, from the input, the reduction effort between the two receiving shafts without requiring one of them to withstand the total torque, which must subsequently be divided. There is thus obtained a reduction of load on the teeth of the input pinion and on the corresponding bearing of the secondary shaft.

In addition, the transfer countershaft is used as a speed-reducing couple instead of simply transmitting a movement of rotation at the same speed to the two receiving shafts 2 and 2'.

The gear box, basic member of the mechanism, can be located at the front or the rear of the vehicle, the transfer being effected on the other axle or axles of the vehicle.

A power take-off can readily be added at the end of the input shaft of the box.

Figure 12:
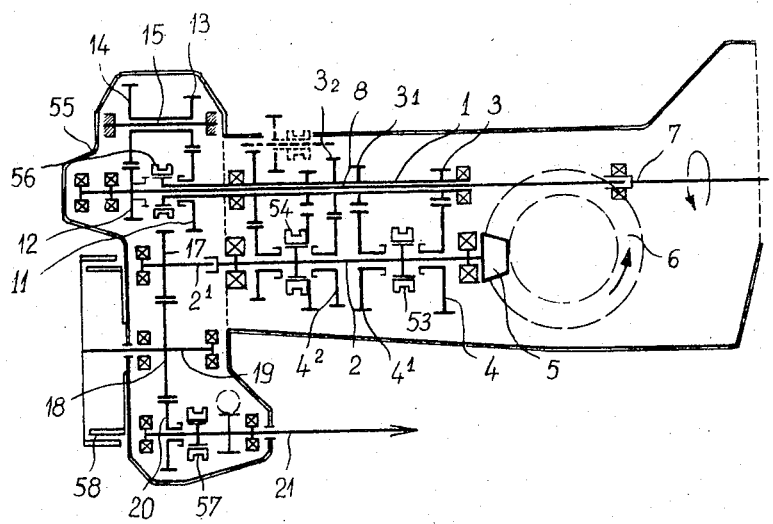
FIG. 12 is a diagrammatic view of another form of the present invention.

In the form of embodiment shown in FIG. 12, it can be seen that the gear-box again comprises the same essential elements as described and shown in the preceding embodiments.

The hollow primary shaft 1 receives the driving shaft 8 driven by the shaft 7.

The secondary shaft 2 drives the bevel gears 5 and 6. The pinions of the various gears carried by the shafts 1 and 2 are indicated: for the first gear at 3 and 4; the second gear at $3^1$, $4^1$; the third gear at $3^2$, $4^2$.

Sliding gears 53 and 54 enable the various gears to be engaged.

In the cover 55 of the gear-box shown on the left of the figure, are grouped together the parts of the additional reduction gear system.

Thus, the pinion 12 carried by the shaft 8 engages with the pinion 14 of the double pinion 14–13 mounted freely on the shaft 15, while the pinion 13 engages with the pinion 11 rotating freely on the primary shaft 1. One of the characteristics of this embodiment resides in the elimination of the male dog carried by the sliding shaft 8 in the embodiment of FIG. 1, which could be engaged by sliding this shaft, either with the pinion 12 or with the pinion 11.

In the present arrangement, as shown in the drawing, the shaft 8 is no longer sliding and a sliding gear 56 carried by the primary shaft 1 can be engaged with the dogs either of the pinion 12 driven by the shaft 8 for the normal use of the gear-box, or of the pinion 11 for the supplementary reduction gear, which constitutes a simplification since the sole operation of a sliding gear enables this result to be obtained, instead of causing the driving shaft to slide.

The secondary shaft 2' carries the pinion 17 driven by this shaft, and this pinion 17 engages with the intermediate pinion 18, itself in engagement with the pinion 20 which can be made fast with the shaft 21 driving the other axle or axles of the vehicle, with the sliding gear 57.

For the additional reduction gear, the sliding gear 56 is engaged with the pinion 11 and the movement passes through the pinion 12, the double pinion 14, 13, the reversing pinion 11, the shaft 1 and the pinions 3 and 4 of the first gear and the bevel gears 5 and 6, when the first gear is engaged. The movement can also pass either through the pinions $3^1$, $4^1$ of the second gear, $3^2$, $4^2$ of the third gear, etc. when these gears are engaged, which makes it possible to obtain a continuous succession of step-down ratios and in consequence an improvement of performance.

There has also been shown in FIG. 12 the disjunction of a brake 58 on an extension of the intermediate shaft 19, between the extension $2^1$ of the secondary shaft 2 and the transfer shaft 21 towards the additional axle or axles. This auxiliary brake 58 is actuated under a single control with the conventional parking brake, in order to ensure the certain immobilization of the vehicle on the steepest slopes.

An advantage resulting from the arrangement of this transmission consists of obtaining a mechanical efficiency greater than that which is obtined by a separate transfer box.

In fact, in the combination with one driving axle, the power is transmitted to the driving wheels through the usual channel of the box without passing through the intermediary of the pinions located in the transfer group.

Finally, this being general in all the devices described, a safety mechanism must prevent the engagement of the exceptional reduction gear when the transfer to all the axles is not in engagement, in order to protect the bevel gears of the conventional gear-box against the effects of a considerable overload.

What is claimed is:

1. A change-speed gear unit for a motor vehicle transmission operatively connected to at least one drive axle and having a special speed reduction for running on varied ground, said vehicle including an engine, drive shaft operatively connected to be driven by said engine, said gear unit including a conventional change-speed gear box and an additional speed reduction gearing operatively connected to said change-speed gear box, a primary shaft operatively connected to said drive shaft, a secondary shaft operatively connected to drive said drive axle, gear pinion means on each said shaft, and means for selectively connecting said gear pinion means, said additional speed-reduction gear means operatively and selectively connecting said additional speed-reduction gear to the primary shaft thereby effecting a speed reduction of the drive axle, a central pinion driven by said secondary shaft, counter gears operatively connected to said central pinion for driving other drive axles.

2. A transmission gearbox according to claim 1, in which said primary shaft is hollow and has said drive shaft passing therethrough, and said speed-reduction gearing comprises first dog means movably mounted on the extremity of said drive shaft, a pinion fixedly mounted on the primary shaft, said first dog means selectively engaging said pinion for driving said shaft in normal running in all the ratios of the gearbox without additional speed reduction, and a shaft forming an extension of the primary shaft and having an auxiliary pinion mounted thereon, means for engaging said auxiliary pinion with the pinion mounted on said primary shaft to obtain a special additional reduction gear with the pinions of first gear engaged, a pinion mounted on said secondary shaft, a second dog means for selectively engaging said pinion with said central pinion thereby causing said pinion to actuate an intermediate pinion fixed on a shaft to drive the remainnig axles.

3. A transmission gearbox according to claim 2 further comprising interlock means to prevent the engagement of the first dog means on the pinion when the second dog means is not engaged on the central pinion.

4. A transmission gearbox as claimed in claim 1 further comprising an epicycloidal train of gears, a central pinion of said epicycloidal gear train being fixedly mounted on said primary shaft, at least one satellite gear, a fixed crown wheel, said satellite gears meshing with both said crown wheel and central pinion, a satellite gear carrier, dog means mounted on said carrier for coupling the latter to the secondary shaft.

5. A transmission gearbox according to claim 1, in which a pinion is mounted on said primary shaft, an auxiliary shaft having a pinion thereon engaging with said pinion on said primary shaft, a sliding gear mounted on said auxiliary shaft a double pinion freely mounted on the primary shaft, said sliding gear selectively engaging one pinion of said double pinion, the other pinion of said double pinions engaging with a pinion carried by a secondary shaft, this latter pinion engaging with said counter gears for driving the other axles.

6. A transmission gearbox according to claim 5 further comprising an intermediate shaft between the secondary shaft and a transfer shaft leading to the additiona axles, an auxiliary brake mounted on said intermediate shaft and operatively connected for operation conjointly with a conventional parking brake.

7. A transmission according to claim 1, comprising a pinion on the primary shaft, a sliding gear rotatably fas with said primary shaft and slidable thereon to actuate said pinion, a shaft forming an extension of the secondary shaft and having a double pinion mounted thereon said sliding gear bringing said pinion into engagement with one pinion of said double pinion, an auxiliary shaft having a first pinion thereon, the other pinion of said double pinion being in engagement with said pinion of the auxiliary shaft, a second pinion on said auxiliary shaft, dog gear means for selectively fixing said second pinion with respect to said auxiliary shaft, said second pinion engaging with a pinion of the secondary shaft, a pinion mounted freely on a shaft driving the other axles, a second dog gear to selectively fix said pinion with respect to said shaft driving the other axles, said last-named pinion and said second pinion being in engagement.

8. A transmission gearbox according to claim 1 in which the additional speed-reduction gearing is selectively actuated by a sliding gear carried by the primary shaft, said sliding gear being engaged with one pinion of the reduction gearing for the normal operation of the gearbox and with another pinion of the speed reduction gearing, which is freely mounted on the primary shaft, for operation of the gearbox with the additional speed-reduction gear.

9. A transmission gearbox according to claim 1 in which the speed reduction is effected first by a set of pinions mounted on the end of the primary shaft of the gearbox, and second by selectively utilizing the pinions of said gearbox.

References Cited

UNITED STATES PATENTS

| 2,290,089 | 7/1942 | Bock | 74—665 |
| 2,975,656 | 3/1961 | Haverlender | 74—745 |
| 3,130,605 | 4/1964 | Kennedy | 74—745 |

DONLEY J. STOCKING, *Primary Examiner.*

H. S. LAYTON, *Assistant Examiner.*